United States Patent Office 3,489,536
Patented Jan. 13, 1970

3,489,536
PROCESS FOR SCANDIDING METALS
Newell C. Cook, Schenectady, N.Y., assignor to General Electric Company, a corporation of New York
No Drawing. Filed Nov. 10, 1966, Ser. No. 593,325
Int. Cl. B23p 3/00
U.S. Cl. 29—194                                                9 Claims

ABSTRACT OF THE DISCLOSURE

Scandide coatings are formed on specified metal compositions by forming an electric cell containing said metal composition as the cathode joined through an external electrical circuit to a scandium anode using a specified fused electrolyte maintained at a temperature of at least 600° C., but below the melting point of said metal composition. This cell generates electricity, but, if desired, an E.M.F. may be impressed on the circuit providing the cathode current density does not exceed 10 amperes/dm.$^2$. The scandium diffuses into the base metal to form a coating on the substrate composed of scandium and the substrate metal. This process is useful in making such coatings on the substrate metals.

---

This invention relates to a method for metalliding a base metal composition. More particularly, this invention is concerned with a process for scandiding a base metal composition in a fused salt bath.

I have discovered that a uniform tough, adherent scandide coating can be formed on a specific group of metals employing low current densities, that is, current densities in the range of 0.05–10 amperes/dm.$^2$.

In accordance with the process of this invention, the scandium metal is employed as the anode and is immersed in a fused salt bath composed essentially of a member of the class consisting of the alkali metal fluorides mixtures thereof and mixtures of the alkali metal fluorides with calcium fluoride, strontium fluoride or barium fluoride and containing from 0.01–5 mole percent of scandium fluoride. The cathode employed is the base metal upon which deposit is to be made. I have found that such a combination is an electric cell in which an electric current is generated when an electrical connection, which is external to the fused bath, is made between the base metal cathode and the scandium anode. Under such conditions, the scandium dissolves in the fused salt bath and scandium ions are discharged at the surface of the base metal cathode where they form a deposit of scandium which immediately diffuses into and reacts with the base metal to form a scandide coating. In the specification and claims I use the term scandiding to designate any solid solution or alloy of scandium and the base metal regardless of whether the base metal does or does not form an intermetallic compound with scandium in definite stoichiometric proportions which can be represented by a chemical formula.

The rate of dissolution and deposition of the scandium is self regulating in that the rate of deposition is equal to the rate of diffusion of the scandium into the base metal cathode. The deposition rate can be decreased by inserting some resistance in the circuit. A faster rate can be obtained by impressing a limited amount of voltage into the circuit to supply additional direct current.

The alkali metal fluorides which can be used in accordance with the process of this invention include the fluorides of lithium, sodium, potassium, rubidium and cesium. However, it is preferred to employ an eutectic mixture of sodium fluoride and lithium fluoride because some free alkali metal is produced by a displacement reaction and potassium, rubidium and cesium are volatilized with the obvious disadvantages. It is particularly preferred to employ lithium fluoride as the fused salt bath in which the scandium fluoride is dissolved, because at the temperatures at which the cell is operated, lithium metal is not volatilized to any appreciable extent. Mixtures of the alkali metal fluorides with calcium fluoride, strontium fluoride or barium fluoride can also be employed as a fused salt in the process of this invention.

The chemical composition of the fused salt bath is critical if good scandide coatings are to be obtained. The starting salt should be as anhydrous and as free of all impurities as is possible or should be easily dried or purified by simply heating during the fusion step. The process must be carried out in the substantial absence of oxygen since oxygen interferes with the process. Thus, for example, the process can be carried out in an inert gas atmosphere or in a vacuum. By the term "substantial absence of oxygen" it is meant that neither atmospheric oxygen nor oxides of metals are present in the fused salt bath. The best results are obtained by starting with reagent grade salts and by carrying out the process under vacuum or an inert gas atmosphere, for example, in an atmosphere of argon, helium, neon, krypton or xenon.

I have sometimes found that even commercially available reagent grade salts must be purified further in order to operate satisfactorily in my process. This purification can be readily done by utilizing scrap metal articles as the cathodes and carrying out the initial scandiding runs with or without an additional applied voltage, thereby plating out and removing from the bath those impurities which interfere with the formation of high quality scandide coatings.

The base metals which can be scandided in accordance with the process of this invention included the metals having atomic numbers of from 25 to 29, 43 to 47 and 75 to 79 inclusive. These metals are, for example, manganese, iron, cobalt, nickel, copper, technetium, ruthenium, rhodium, palladium, silver, rhenium, osmium, iridium, platinum and gold. Alloys of these metals with each other or alloys containing these metals as the major constituent, that is, over 50 mole percent, alloyed with other metals as a minor constituent, that is, less than 50 mole percent, can also be scandided in accordance with my process, providing the melting point of the resulting alloy is not lower than the temperature at which the fused salt bath is being operated. It is preferred that the alloy contain at least 75 mole percent of the metal and even more preferred, that the alloy contain 90 mole percent of the metal with correspondingly less of the alloying constituent.

The form of the anode is not critical. For example, I can employ as the anode pure scandium metal in the form of a rod or the scandium can be employed in the form of chips in a porous molybdenum or tungsten basket.

In order to produce a reasonably fast plating rate and to insure the diffusion of the metal into the base metal to form a scandide, I have found it desirable to operate my process at a temperature of from about 600° C. to 1100° C. It is usually preferred to operate at temperatures of from 900°–1100° C.

The temperature at which the process of this invention is conducted is dependent to some extent upon the particular fused salt bath employed. Thus, for example, when temperatures as low as 600° C. are desired, an eutectic of potassium and lithium fluoride can be employed. Inasmuch as the preferred operating range is from 900° C. to 1100° C., I prefer to employ lithium fluoride as the fused salt.

When an electrical circuit is formed external to the fused salt bath by joining the scandium anode to the base metal cathode by means of a conductor, an electric current will flow through the circuit without any applied electromotive force. The anode acts by dissolving in the fused salt bath to produce electrons and scandium ions. The electrons flow through the external circuit formed by the conductor and the scandium ions migrate through the fused salt bath to the base metal cathode to be metallided, where the electrons discharge the scandium ions as a scandide coating. The amount of current can be measured with an ammeter which enables one to readily calculate the amount of scandium being deposited on the base metal cathode and being converted to the scandide layer. Knowing the area of the article being plated, it is possible to calculate the thickness of the scandide coating formed, thereby permitting accurate control of the process to obtain any desired thickness of the scandide layer.

Although the process operates very satisfactorily without impressing any additional electromotive force on the electrical circuit, I have found it possible to apply a small voltage when it is desired to obtain constant current densities during the reaction, and to increase the deposition rate of the scandium being deposited without exceeding the diffusion rate of the scandium into the base metal cathode. The additional E.M.F. should not exceed 1.0 volts and preferably should fall between 0.1 and 0.5 volt.

Since the diffusion rate of scandium into the cathode article varies from one material to another, with temperature, and with the thickness of the coating being formed, there is always a variation in the upper limits of the current densities that may be employed. Therefore, the deposition rate of the iding agent must always adjusted so as not to exceed the diffusion rate of the iding agent into the substrate material if high efficiency and high quality diffusion coatings are to be obtained. The maximum current density for good scandiding is 10 amperes/dm.$^2$, when operating within the preferred temperature ranges of this disclosure. Higher current densities can sometimes be used to form coatings with scandium but in addition to the formation of a metallide coating, plating of the iding agent occurs over the diffusion layer.

Very low current densities (.01–.1 amperes/dm.$^2$) are often employed when diffusion rates are correspondingly low, and when very dilute surface solutions or very thin coatings are desired. Often the composition of the diffusion coating can be changed by varying the current density, producing under one condition a composition suitable for one application and under another condition a composition suitable for another application. Generally, however, current densities to form good quality scandide coatings fall between .5 and 5 amperes per dm.$^2$ for the preferred temperature ranges of this disclosure.

When it is desirable to apply additional voltage to the circuit in order to shorten the time of operation, the total current density should not exceed 10 amperes/dm.$^2$. At current densities above 10 amperes/dm.$^2$, the deposition rate exceeds the diffusion rate and the base metal cathode becomes coated with a plate of pure scandium.

If an applied E.M.F. is used, the source, for example, a battery or other source of direct current, should be connected in series with the external circuit so that the negative terminal is connected to the external circuit, terminating at the base metal being metallided and the positive terminal is connected to the external circuit, terminating at the scandium anode. In this way, the voltages of both sources are algebraically additive.

As will be readily apparent to those skilled in the art, measuring instruments such as voltmeters, ammeters, resistances, timers, etc., may be included in the external circuit to aid in the control of the process.

Because the tough adherent corrosion resistant properties of the scandide coatings are uniform over the entire treated area, the scandide coated metal compositions prepared by my process have a wide variety of uses. They can be used to fabricate reaction vessels for chemical reactions, to make gears, bearings and other articles requiring hard, wear-resistant surfaces. Other uses will be readily apparent to those skilled in the art as well as other modifications and variations of the present invention in light of the above teachings.

The following examples serve to further illustrate my invention. All parts are by weight unless otherwise stated.

EXAMPLE 1

Lithium fluoride (3178 grams) was charged into a Monel liner (5″ diameter x 12″ deep) and the liner inserted into a mild steep pot (5½″ diameter x 18″ deep). The pot was placed in an electric furnace (6″ in diameter x 20″ deep). The mild steel pot had a flange at the upper portion which was connected to a cover plate of nickel plated steel which contained a water channel for cooling, two ports 2½″ in diameter) for glass electrode towers and two 1″ ports for a thermocouple probe and a gas bubbler or vacuum connection. A vacuum was pulled on the cell and the lithium fluoride melted. Argon was then bled into the cell and scandium fluoride (50 grams) was added to the lithium fluoride. While continuously passing argon through the cell, a graphite anode, shielded with a Monel screen to prevent carbon particles from getting into the salt was immersed in the fused salt to a depth of 4 inches and a nickel strip inserted as the cathode. Employing three different nickel strips, the cell was operated at 1000° C. with an applied E.M.F. for 18½ hours to rid bath of interfering impurities.

The graphite anode was then replaced by a scandium anode 5″ x ¼″ diameter) and a nickel strip (6″ x 1″ x 0.020″) was employed as a cathode and scandided at 980° C. in accordance with the data in Table I.

TABLE I

| Time, mins.: | Volts Anode polarity | Current density, amps/dm.$^2$ | |
|---|---|---|---|
| 0 | −0.420 | 0 | |
| 1 | −0.110 | 2 | Current on. |
| 1:30 | −0.105 | 2 | Current increased. |
| 1:35 | +0.150 | 4 | |
| 5 | +0.175 | 4 | |
| 6:45 | +0.180 | 4 | Current off. |
| 7 | −0.030 | 0 | |
| 8 | −0.050 | 0 | Sample out. |

The sample gained 0.138 gram of a theoretical 140 (based on the cathode reduction, $Sc^{+3}+3e \rightarrow Sc^0$), was shiny, grainy and flexible. The coating was 1 mil. thick and appeared to be predominately plating with a thin diffusion layer bonding the plating firmly to the nickel. The voltages show that scandiding can be run as battery.

EXAMPLE 2

Employing the cell described in Example 1, with a scandium anode, a cobalt strip (4″ x ¾″ x 0.060″) was scandided at 1000° according to the following data:

TABLE II

| Time, min.: | Volts Anode polarity | Current density, amps/dm.$^2$ | |
|---|---|---|---|
| 0 | −0.390 | 0 | |
| 1 | +0.070 | 3.7 | Current on. |
| 6 | +0.260 | 3.7 | Current off. |
| 7 | −0.250 | 0 | Sample out. |

The sample was covered with a black material which washed off easily revealing a smooth shiny surface and a 0.4 mil. coating (485 KHN), which was all diffusion. The sample had gained 0.058 gram of a theoretical 0.084 gram.

EXAMPLE 3

Employing the cell described in Example 1, a copper strip (3″ x 1″ x .020″) was scandided at 980° using a scandium anode as follows:

TABLE III

| Time, min.: | Volts Anode polarity | Current density, amps/dm.$^2$ | |
|---|---|---|---|
| 0 | −0.410 | 0 | |
| 1 | −0.020 | 2.0 | Current on. |
| 6 | −0.010 | 2.0 | |
| 11 | −0.005 | 0 | Current off. |
| 12 | −0.210 | 0 | Sample out. |

The sample had melted on the surface and some material had dripped off. The surface had a silvery color and was slightly harder than copper. The coating was very flexible.

EXAMPLE 4

Employing the cell described in Example 1, a Monel strip (1″ x 3¾″ x 1/16″) was scandided at 1000° using a scandium anode as follows:

TABLE IV

| Time, min.: | Volts Anode polarity | Current density, amps/dm.$^2$ | |
|---|---|---|---|
| 0 | −0.430 | 0 | |
| 1 | +0.155 | 5.0 | Current on. |
| 11 | +0.210 | 5.0 | Current off. |
| 12 | −0.050 | 0 | Sample out. |

The sample gained 0.261 gram (93.5%) and had a very rough but shiny surface. Metallographic examination showed a 3 mil coating—the other mil of which appeared to be primarily plating and the inner layer true diffusion. The surface appearance suggested that some copper from the Monel had diffused out into the scandium as it was plating onto the Monel surface.

EXAMPLE 5

Employing the cell described in Example 1, a strip of palladium (1″ x ½″ x 0.010″) was scandided at 1000° using a scandium anode as follows:

TABLE V

| Time, min.: | Volts Anode polarity | Current density, amps/dm.$^2$ | |
|---|---|---|---|
| 0 | −0.31 | 0 | |
| 1 | −0.30 | 0 | |
| 2 | +0.80 | 0.18 | Current on. |
| 17 | +1.5 | 0.18 | Current off. |
| 18 | +0.8 | 0 | Sample out. |

The sample was coated with black material which readily washed off revealing a grey grainy surface. The strip gained 0.014 gram (52%), grew 1.2 mils and enveloped a 1 mil coating which was moderately hard and very flexible.

It will, of course, be apparent to those skilled in the art that modifications other than those set forth in the above examples can be employed in the process of this invention without departing from the scope thereof.

What I claim as new and desire to secure by Letters Patent of the United States is:

1. A method of forming a scandide coating on a metal composition having a melting point greater than 900° C., at least 50 mole percent of said metal composition being at least one of the metals selected from the class consisting of metals whose atomic numbers are 25 to 29, 43 to 47 and 75 to 79, said method comprising (1) forming an electric cell containing said metal composition as the cathode, joined through an external electrical circuit to a scandium anode and a fused salt electrolyte which consists essentially of a member of the class consisting of lithium, fluoride, sodium fluoride, mixtures thereof, and mixtures of said fluorides with a member of the class of calcium fluoride, strontium fluoride or barium fluoride and from 0.01–5 mole percent of scandium fluoride, said electrolyte being maintained at a temperature of at least 900° C., but below the melting point of said metal composition in the substantial absence of oxygen, (2) controlling the current flowing in said electric cell so that the current density of the cathode does not exceed 10 amperes/dm.$^2$ during the formation of the scandide coating, and (3) interrupting the flow of electrical current after the desire thickness of the scandide coating is formed on the metal object.

2. The process of claim 1 wherein the fused salt electrolyte consists essentially of lithium fluoride and scandium fluoride.

3. The process of claim 1 which is also conducted in the substantial absence of carbon.

4. The process of claim 1 wherein the absence of oxygen is obtained by use of an inert gas in the cell.

5. The method of claim 1 wherein the metal composition is nickel.

6. The method of claim 1 wherein the metal composition is cobalt.

7. The method of claim 1 wherein the metal composition is iron.

8. The method of claim 1 wherein the metal composition is copper.

9. A metal product produced in accordance with the process of claim 1.

References Cited

UNITED STATES PATENTS

| Re. 25,630 | 8/1964 | Cook | 204—39 |
| 2,828,251 | 3/1958 | Sibert et al. | 204—39 |
| 3,024,175 | 3/1962 | Cook | 204—39 |
| 3,024,176 | 3/1962 | Cook | 204—39 |
| 3,232,853 | 2/1966 | Cook | 204—39 |

FOREIGN PATENTS 742,190   9/1966   Canada.

OTHER REFERENCES

J. Electrochemical Society, vol. 112, No. 3, 1965, pp. 266–272.

ROBERT K. MIHALEK, Primary Examiner

R. L. ANDREWS, Assistant Examiner

U.S. Cl. X.R.

204—39